United States Patent [19]

Takahashi

[11] 4,327,494

[45] May 4, 1982

[54] LINEAR GAUGE

[75] Inventor: Seigo Takahashi, Kawasaki, Japan

[73] Assignee: Mitutoyo Mfg. Co., Ltd., Tokyo, Japan

[21] Appl. No.: 199,205

[22] Filed: Oct. 21, 1980

[30] Foreign Application Priority Data

Oct. 22, 1979 [JP] Japan ................................ 54-146814

[51] Int. Cl.³ .............................................. G01B 7/02
[52] U.S. Cl. .................................................. 33/172 E
[58] Field of Search ............. 33/172 E, 169 R, 147 N, 33/174 M, 174 L

[56] References Cited

U.S. PATENT DOCUMENTS 3,460,263  8/1969  Graham ........................... 33/174 M
4,008,523  2/1977  Voros .............................. 33/147 N
4,117,601  10/1978  Kober et al. .................... 33/125 C X Primary Examiner—Harry N. Haroian Attorney, Agent, or Firm—Koda and Androlia

[57] ABSTRACT

A linear gauge comprising: a frame; a spindle axially slidably supported by a frame and provided at the forward end thereof with a measuring element; a movable block fixed on the inner end portion of the spindle; a glass scale fixed in the frame in parallel to the spindle; a luminous element, an index scale and a receptor element, all of which are supported by the movable block, with the glass scale interposed between the luminous element and the index scale; a takeup pulley provided at the upper portion in the frame and a guide pulley provided at the lower portion in the frame; a cord connected at one end thereof to the takeup pulley, at the other end to the movable block and wound around the guide pulley; and a spring engaged between the upper pulley and the frame for biasing the upper pulley in the rotating direction corresponding to the outwardly extending direction of the spindle.

1 Claim, 4 Drawing Figures

LINEAR GAUGE

BACKGROUND OF THE INVENTION

1. Field of the Invention

The present invention relates to linear gauges, and more particularly to construction of a linear gauge incorporating therein an optical reading device.

2. Description of the Prior Art

Heretofore, in the linear gauges of the type described, there has been adopted such a construction wherein a spindle provided at the forward end thereof with a measuring element is axially slidably supported by a frame, a glass scale is fixed on the inner end of the spindle and an optical reading device including a luminous element, a receptor element and the like is fixed on the frame. Further, as a spring for biasing the spindle in the extendedly projecting direction, there has been used a compression coil spring provided in the frame.

With the conventional construction as described above, the glass scale has been fixed on an extension of the spindle, whereby the movable portion becomes long and a stroke for the movable portion has to be provided upwardly of the glass scale, thus presenting a problem of that the frame is also increased in length.

Furthermore, use of the compression spring as the spring for biasing the movable portion has resulted in fluctuating biasing force in proportion as the spindle is changed in its position, thereby presenting a problem of that the measuring pressure fluctuates to a considerable extent.

SUMMARY OF THE INVENTION

The present invention has been developed to obviate the problems of the prior art as described above and has as its object the provision of a linear gauge being of a compact construction in which the fluctuation in the measuring pressure is low.

More specifically, according to the present invention, there is provided a linear gauge comprising: a frame; a spindle axially slidably supported by the frame and provided at the forward end thereof with a measuring element; a movable block fixed on the inner end portion of the spindle; a glass scale fixed in the frame in parallel to the spindle; a luminous element, and index scale and a receptor element, all of which are supported by the movable block with the glass scale interposed between the luminous element and the index scale; a takeup pulley provided at the upper portion in the frame and a guide pulley provided at the lower portion in the frame; a cord connected at one end thereof to the takeup pulley, at the other end to the movable block and wound around the guide pulley; and a spring engaged between the upper pulley and the frame for biasing the upper pulley in the rotating direction corresponding to the extending direction of the spindle.

As described above, the glass scale is fixed on the frame and the optical reading device is mounted on the movable block, whereby the movable portion can be reduced in length with the measuring range remaining the same, so that the frame can be decreased in length as compared with the linear gauges of the prior art, thus enabling to provide a compact linear gauge as a whole.

Furthermore, the cord wound on two pulleys are connected to the movable block and the takeup pulley is biased by a coiled spring in a direction corresponding to the projecting direction of the spindle, so that the fluctuation in the measuring pressure can be reduced, thereby enabling to improve the accuracies in the measurement.

In addition to the abovedescribed arrangement, such an arrangement is preferable that a guide bar disposed in parallel to the spindle is fixed on the frame, the movable block is provided thereon with a bifurcated shape and a bifurcated portion thus formed is slidably engaged with the guide bar. With the arrangements as described above, looseness in the movable portion can be eliminated and an accurate rectilinear motion can be rendered to the movable portion, thus enabling to minimize errors in measuring.

Further, in addition to the abovedescribed arrangement, such an arrangement is preferable that a luminous element, index scale and receptor element are fixed on a holding member other than the movable block, the holding member and the movable block are solidly secured to each other in a manner to be angularly adjustable about the axis of a cylindrical roller, which is disposed in a V-groove formed substantially in the horizontal direction on a mounting surface of the holding member 28 and interposed between the holding member and the movable block, by means of clamping screws provided at positions above and below the V-groove. Thus, parallelism between the scales of the index scale and the glass scale can be finely adjusted with precision, thereby enabling to improve accuracies in measuring.

Reference is now made to the Figures into a detailed description of the invention. It is to be understood, however, that the Figures and the detailed description of the invention are purposes of illustration only and are not intended to be limits of the invention.

DETAILED DESCRIPTION OF THE INVENTION

Figure 1:
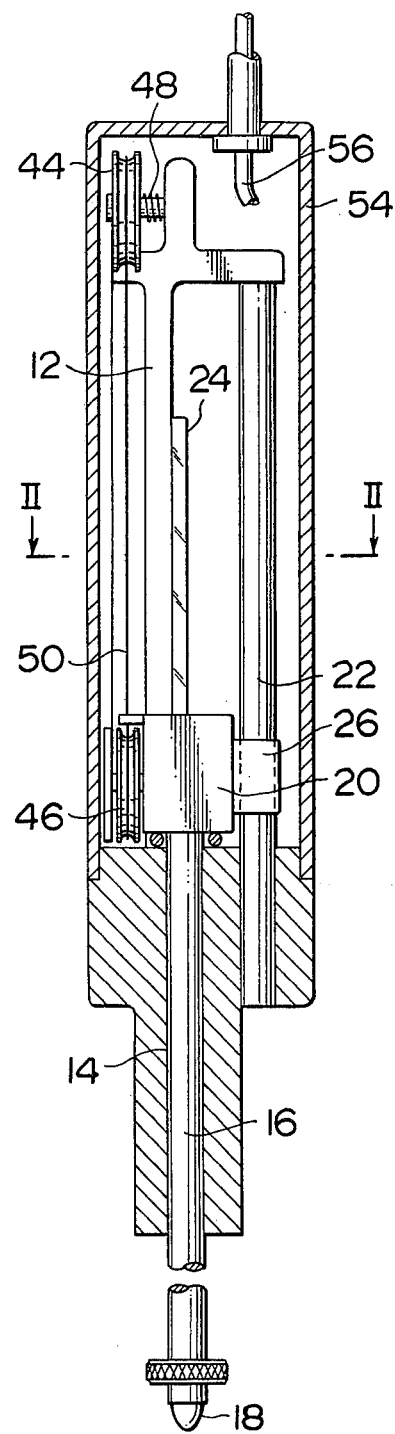
FIG. 1 is a longitudinal sectional view showing an embodiment of the linear gauge according to the present invention.
Figure 2:
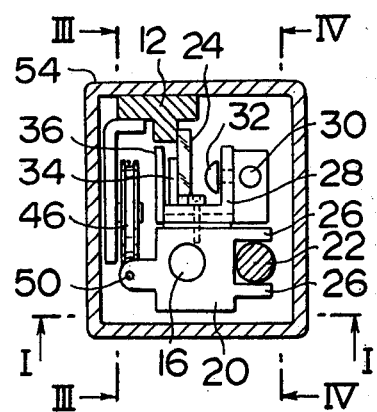
FIG. 2 is a sectional view taken along the line II—II in FIG. 1.
Figure 3:
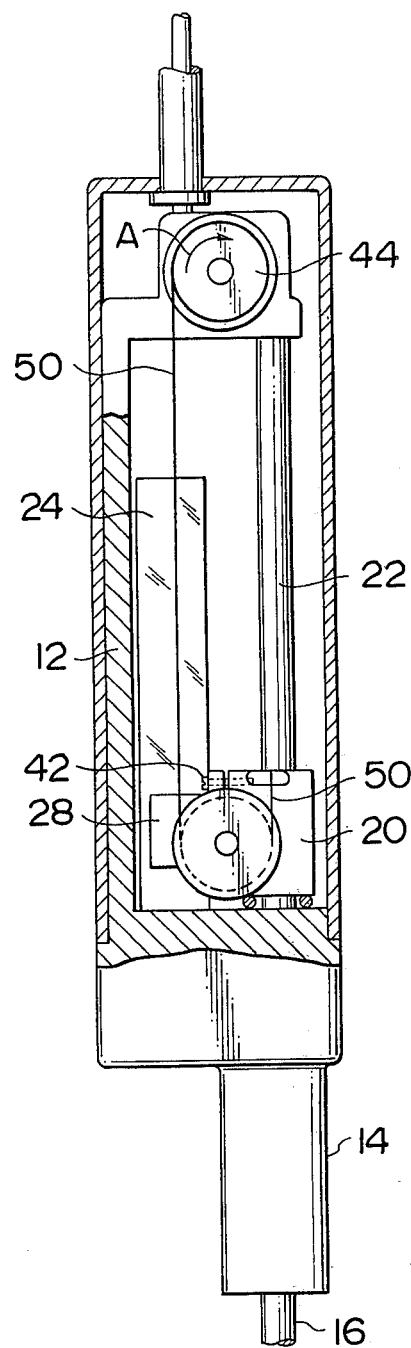
FIG. 3 is a longitudinal sectional view taken along the line III—III in FIG. 2.

Description will hereunder be given of an embodiment of the present invention with reference to the drawings.

In FIGS. 1 through 4, a spindle 16 axially slidable is coupled into a bearing hole 14 formed at the lower portion of the frame 12, and a measuring element 18 is secured to the forward end of the spindle. A movable block 20 is fixed on the inner end of the spindle 16, and effects a motion of stroke together with the spindle to the frame. A guide bar 22 and a glass scale 24, both of which extend in parallel with the spindle, are fixed in the frame. The aforesaid movable block 20 has a bifurcated portion 26 engageable with the guide bar 22 and is guided along the guide bar.

Fixed on the movable block is a holding member 28, on which is mounted an optical reading device consisting of a luminous element 30 such as a lamp positioned at one side of the glass scale 24, a lens 32 and an index scale 34 positioned at the other side of the glass scale 24. In this optical reading device, rays emitted from the luminous element 30 are converged by the lens 32, transmitted through the glass scale 24, and the rays thus transmitted through the glass scale are received by the receptor element 36 through the index scale 34 so as to be detected.

Figure 4:
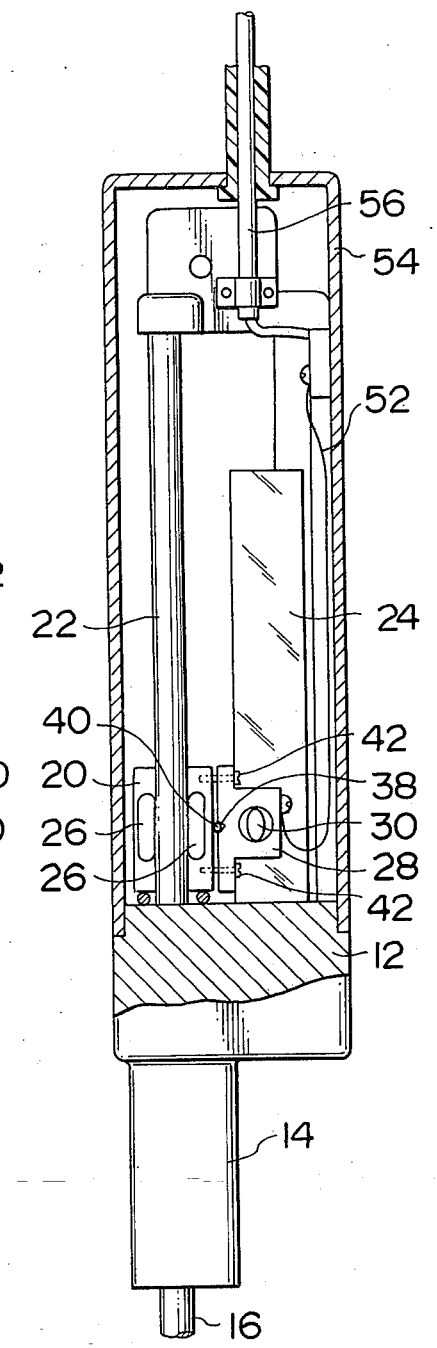
FIG. 4 is a longitudinal sectional view taken along the line IV—IV in FIG. 2.

As shown in FIG. 4, a groove 38 disposed in the horizontal direction and being of a letter 'V' shape in cross section is formed on either the mounting surface of the holding member 28 or the mounting surface of the movable block 20 (in the example illustrated, the mounting surface of the holding member is chosen), or on the mounting surfaces of both the holding member 28 and the movable block 20, and a roller 40 is disposed in the groove, so that the holding member 28 can be tilted to the movable block 20 about the axis of the horizontal roller within a limited angular range. The holding member 28 is fixed to the movable block 20 by means of screws 42, 42 provided at positions above and below the roller 40. Consequently, screwed-in depths of these screws 42, 42 are adjusted, so that the angle of securing the holding member 28 to the movable block 20 can be finely adjusted. This angular adjustment is effected in order to obtain precise parallelism between the scales of the index scale 34 and the glass scale 24.

A takeup pulley 44 is secured to the upper portion of the frame 12 and a guide pulley 46 is secured the lower portion thereof. Engaged between the takeup pulley 44 and the frame 12 is a coiled spring 48 which biases the takeup pulley in a rotating direction corresponding to the extending direction of the spindle 16 (in a direction indicated by an arrow A in FIG. 3).

A cord 50 is stretched between the takeup pulley 44 and the movable block 20. This cord is connected at one end thereof to the takeup pulley 44, wound on the takeup pulley a desired number of times, extended downwardly, changed in direction at the guide pulley 46, and connected at the other end thereof to the movable block 20.

A flexible electric conductor 52 (Refer to FIG. 4) is inserted between the frame 12 and the holding member 28, and adapted to supply an electric power introduced through a cover 54 from a conductor 56 to the optical reading device mounting on the holding member 28.

FIGS. 1 through 4 show the spindle being extended to the maximum. In the case of measuring a distance on a straight line such as a height or length, the measuring element 18 is brought into contact with an object to be measured, thereupon the spindle is retracted upwardly, and then, the position of the spindle thus retracted is detected by the optical reading device, so that the distance from a reference can be measured. A signal detected by the optical reading device is led to an external device, and indicated in a manner to be directly readable by means of a digital indicator in most cases.

According to the present invention with the abovedescribed arrangements, the following advantages can be offered.

According to the present invention, the glass scale 24 is fixed on the frame 12 and the optical reading device is mounted on the movable block 20 of the spindle, whereby the movable portion can be reduced in length with the measuring range remaining the same, so that the frame can be decreased in length as compared with the linear gauges of the prior art, thus enabling to provide a compact linear gauge as a whole.

According to the present invention, the cord 50 wound on the two pulleys is connected to the movable block and the measuring pressure is rendered by the coiled spring for biasing the takeup pulley 44, so that the fluctuation in the measuring pressure during measurement can be reduced, thereby enabling to effect precise measuring.

According to the present invention, the movable block 20 is guided by the guide bar 22 fixed on the frame, so that looseness in the movable portion can be eliminated and an accurate rectilinear motion can be rendered to the movable portion, thus enabling to minimize errors in measuring.

According to the present invention, the optical reading device including the index scale 34 is secured to the holding member other than the movable block 20 and means 38, 40 and 42 for finely adjusting the inclination of the holding member are provided, so that parallelism between the scales of the index scale 34 and the glass scale 24 can be finely adjusted with precision, thereby enabling to improve accuracies in measuring.

As apparent from the above description, according to the present invention, there can be provided a linear gauge rendered compact in size and having low fluctuation in the measuring pressure.

What is claimed is:

1. A linear gauge comprising:
 a frame;
 a spindle axially slidably supported by said frame and provided at the forward thereof with a measuring element;
 a guide bar disposed in parallel to said spindle fixed on said frame;
 a movable block fixed on the inner end portion of the spindle, said movable block having formed thereon a bifurcated portion which is slidably engaged with said guide bar;
 a glass scale fixed in the frame in parallel to the spindle;
 a holding member coupled to said movable block by clamping screws;
 a groove formed on either a mounting surface of said holding member or said movable block and provided between said clamping screws;
 a roller provided in said groove between said holding member and said movable block whereby the coupling between said holding member and said movable block is angularly adjustable about an axis of said roller by means of said clamping screws;
 a luminous element, an index scale and a receptor element, all of which are supported by the movable block, with the glass scale interposed therebetween, said luminous element, index scale and receptor element being secured to said holding member;
 a takeup pulley provided at the upper portion in the frame and a guide pulley provided at the lower portion in the frame;
 a cord connected to one end thereof to the takeup pulley, and at the other end to the movable block and stretchingly provided around the guide pulley; and
 a spring engaged between the upper pulley and the frame for biasing the upper pulley in a rotating direction corresponding to the outwardly extending direction of the spindle.

* * * * *